United States Patent Office

2,940,964
Patented June 14, 1960

2,940,964
PROCESS FOR OBTAINING HIGH MELTING ETHYLENE POLYMERS

Rino Mostardini and Alberto Alberti, 18 Via F. Turati, Milan, Italy

No Drawing. Filed Dec. 23, 1957, Ser. No. 704,291

Claims priority, application Italy Jan. 3, 1957

22 Claims. (Cl. 260—94.9)

This invention relates to highly crystalline, high molecular weight polymers of ethylene, and to processes for producing the same.

The early methods for polymerizing ethylene involved the use of high pressure. It is known that the resulting polymers were at most only 40% to 70% crystalline and had, for the polymer of grade 2, a softening point between 90° C. and 100° C. (Vicat test, load 1 kg.) and a melting point between 110° C. and 125° C.

More recently, it was proposed to polymerize ethylene by the so-called Ziegler process, i.e., under a low pressure and with the aid of catalysts prepared from organometallic compounds and liquid high valency transition metal compounds such as titanium tetrachloride in which the metal has the maximum valency corresponding to its position in the Periodic Table and which are soluble in the inert hydrocarbon used in preparing the catalyst and as the polymerization medium. The polyethylenes so produced are less highly branched than the prior "high pressure polyethylenes," are from 60% to 90% crystalline, have a softening point (Vicat test, load 1 kg.) between 120° C. and 125° C., and have, in general, improved mechanical properties as compared to the high pressure polymers.

The polyethylenes produced by the Ziegler method are not the most highly crystalline nor the most valuable polymers of ethylene that can be obtained. Thus, the pending application of Natta et al. Ser. No. 626,767, filed December 6, 1956, shows that even more highly crystalline polymers can be obtained by polymerizing ethylene under low pressure with specific selected catalysts prepared from organometallic compounds and solid crystalline or microcrystalline compounds of the transition metals, such as titanium trichloride, i.e., transition metal compounds in which the metal has a valency lower than the maximum valency corresponding to its position in the Periodic Table and which are insoluble in the inert hydrocarbon solvents. The polymers obtained by the method of said pending Natta et al. application are more highly crystalline (over 90%), have a higher melting point (135° C.–138° C.), and mechanical properties which are superior to those of both the high pressure method and the low pressure method using catalysts prepared from the liquid, soluble transition metal compounds like $TiCl_4$.

The present invention provides another method for obtaining the polyethylenes having the high crystallinity, high melting point, and superior mechanical properties of the polymers disclosed in the pending Natta et al. application, supra.

In accordance with this invention, ethylene is polymerized with the aid of catalysts prepared from organometallic compounds and certain compounds of transition metals of Groups IV to VI of the Periodic Table (Mendeléeff) which are solid and crystalline and insoluble in the inert hydrocarbon solvents, but in which, however, the metal has the maximum valency corresponding to its position in the Periodic Table.

Thus, we find that by reacting suitable metalorganic compounds, particularly alkyl aluminum compounds, with, e.g., tetravalent titanium salts which are crystalline and insoluble in the reaction solvent, we obtain catalysts which polymerize ethylene to the highly (over 90%) crystalline polyethylenes having the high melting point (135–145° C.) and superior mechanical properties characteristic of the polyethylenes produced with the aid of the catalyst prepared from the low valency insoluble transition metal compounds.

Typical crystalline, insoluble salts of tetravalent titanium which may be used in preparing the present catalysts include titanium dichloride-diacetate, titanium dichloride-dipropionate, and titanium trichloride monobenzoate. Other similar crystalline insoluble compounds of titanium may be used, as may also be used corresponding crystalline, insoluble compounds of other transition metals such as zirconium, vanadium, molybdenum, niobium, etc.

The catalysts are obtained by reacting the crystalline, insoluble high valency transition metal compound, in a suitable ratio, with organometallic compounds of metals of Groups II and III of the Periodic Table, and notably alkyl compounds of aluminum or zinc.

In general, the catalyst-forming components may be used in molar ratios which are relatively high. For instance, when alkyl aluminum compounds and titanium compounds are used, the molar ratio can vary between 2 and 20.

Usually, the catalyst is prepared be reacting the organometallic compound and the crystalline, insoluble transition metal compound in an inert hydrocarbon solvent. However, the two components can be reacted in the absence of any solvent. Since the polymerization of the ethylene is carried out in the presence of an inert hydrocarbon solvent, if such solvent is not used in preparing the catalyst, it can be added to the catalyst, or to the reactor in which the polymerization is conducted, before the polymerization is initiated.

The catalyst-forming components may be mixed in the apparatus, such as a suitable autoclave, in which the polymerization is to be conducted and thereafter the temperature may be raised to the desired polymerization temperature, generally between 50° C. and 60° C., and the ethylene introduced under normal pressure or under an increased pressure, e.g., 2 to 50 atoms.

After completion of the polymerization, the polymer is discharged from the autoclave, and purified.

The following table gives a comparison of the properties of polyethylenes produced by the several processes discussed above.

TABLE I

| | Polyethylene obtained by the high pressure process | Polyethylene obtained with Ziegler catalyst ($TiCl_4$+Al alkyl) | Polyethylene obtained with $TiCl_3$ —Al alkyl catalyst | Polyethylene obtained according to the present method |
|---|---|---|---|---|
| Stress at yield point kg./cm.² | 100 | 190 | 280–300 | 260–270 |
| Elongation at yield point, percent | 20–25 | 16 | 10–15 | 9–12 |
| Ultimate tensile strength, kg./cm.² | 110–120 | 240 | 350–400 | 350–400 |
| Elongation at break, percent | 400–600 | 800–1,000 | 600–800 | 400–700 |
| Softening point Vicat (load=1 kg.), degrees | 90–100 | 110–125 | 135–138 | 140 |

It will be apparent from the values listed in the table that the physical properties of the polyethylenes produced by the present method are remarkably better than those of the prior art polyethylenes and are, in general, similar to those obtained using the catalyst prepared from TiCl₃ and aluminum alkyls.

The following examples are given to illustrate specific embodiments of the invention, it being understood that these examples are not intended as limitative.

Example 1

Into a 2 l. oscillating autoclave provided with electrical heating means are introduced 500 cc. of heptane distilled onto sodium, containing 0.33 g.

$$TiCl_2(CH_3COO)_2$$

and 2.35 g. triethyl aluminum. The autoclave is agitated and the temperature is raised to 55° C. Ethylene is then charged into the autoclave, up to a pressure of 33–35 atms. Polymerization proceeds, with decrease in the pressure. When the pressure has dropped to 15–18 atmospheres, additional ethylene is introduced to a pressure of 35 atms., this operation being repeated over a period of 22 hours. 265 g. of polyethylene having a molecular weight of 4,000,000 and a Vicat softening point (load=1 kg.) of 135° C. are obtained.

Example 2

About 500 cc. of heptane (distilled on sodium) and containing 0.18 g. TiCl₂(CH₃COO)₂ and 1.25 g. of diethyl aluminum monochloride are charged into an autoclave as in Example 1. The temperature is raised to 55° C. and ethylene is then introduced up to a pressure of 33–35 atmos. As the polymerization proceeds, the pressure drops. When the pressure has dropped to 18 atmos., it is again raised to 33 atmos. by the addition of further amounts of ethylene. This is repeated over a period of 22 hours, total polymerization time. The polyethylene obtained (340 g.) has a molecular weight of 1,000,000 and a Vicat softening point (load=1 kg.) of 139° C.

Example 3

2000 cc. of heptane (distilled on sodium) and containing 0.72 g. of TiCl₂(CH₃COO)₂ and 4.95 g. of diethyl aluminum monochloride are introduced into a 4 liter jacketed autoclave provided with a vertical stirrer. The stirrer is started and the temperature is raised to 60° C. Ethylene is then introduced up to a pressure of 5 atm. The pressure is kept constant for 6 hours, after which the autoclave is cooled and 525 g. of polyethylene having a molecular weight of 2,000,000 and a Vicat softening point (load=1 kg.) of 139° C. is discharged.

Example 4

0.77 g. of TiCl₃(C₆H₅—COO) and 5 g. of diethyl aluminum monochloride in 500 cc. of heptane are introduced into an autoclave as in preceding examples. Ethylene is then introduced and the polymerization is carried out under a pressure of from 18 to 35 atm. for 22 hours. The polyethylene obtained (480 g.) has a molecular weight of 1,000,000 and a Vicat softening point of 142° C.

Example 5

After charging 500 cc. heptane (distilled on sodium) containing 0.36 g. TiCl₂(CH₃CH₂COO)₂ and 1.5 g. diethyl aluminum monochloride into the autoclave, the ethylene polymerization is carried out as in the preceding examples. 470 g. of polyethylene having a molecular weight of 1,600,000 and a Vicat softening point (load=1 kg.) of 143° C. are obtained.

Example 6

2000 cc. of heptane (distilled on sodium) containing 2 g. TiCl₂(CH₃COO)₂ and 4.2 g. diethyl aluminum monochloride are introduced into a 5 liter autoclave provided with a vertical stirrer and heated by means of circulating oil. The autoclave is heated to 55° C.–50° C. and ethylene is added batchwise, the pressure being maintained between 0 and 15 atm. After 10 hours, 570 g. of polyethylene having a molecular weight of 3,560,000 and a Vicat softening point (load=1 kg.) of 144° C. are discharged.

Example 7

Results similar to those obtained in the foregoing examples are obtained using catalysts prepared by mixing an alkyl zinc compound with, respectively, crystalline titanium chloride-acetate, crystalline titanium chloride-propionate, and crystalline titanium chloride-benzoate, in all of which the titanium has the maximum valency corresponding to its position in the Periodic Table.

Operating as in the preceding examples, 500 cc. of heptane (distilled on sodium) containing 0.6 g. of a crystalline, tetravalent tetanium compound obtained by reaction of titanium tetrachloride with trichloro-acetic acid, and 2.5 g. of diethyl aluminum monochloride are introduced into a 2-liter autoclave. After 20 hours at 55° C., 322 g. of polyethylene having a molecular weight of 1,450,000 and a Vicat softening point (load=1 kg.) of 139° C. are discharged.

In the organometallic compound, all but one of the valencies of the metal of Groups II to III of the Periodic Table (aluminum, magnesium, beryllium, zinc, etc.) may be satisfied by alkyl radicals containing 2 to 16 carbon atoms, the remaining valency being satisfied by an alkyl radical as defined, an alkoxy radical of from 2 to 4 carbon atoms, or halogen.

The transition metal compound may be any high valency crystalline, insoluble compound of titanium, zirconium, hafnium thorium, vanadium, tantalum, niobium, chromium, molybednum, tungsten and uranium. At present, the crystalline insoluble compounds of high valency titanium are preferred.

The solvents which may be used in preparing the catalyst, and as the inert polymerization medium are preferably paraffinic hydrocarbons such as, for instance, a light gasoline substantially free of olefinic bonds, n-heptane, iso-octane, and the like.

The reaction product contains, in addition to the polyethylene and some residual catalyst, impurities comprising inorganic compounds originating from the decomposition of the catalyst. The product may be purified by treating it with a suitable agent, e.g., methanol to decompose the residual catalyst, and bubbling hydrochloric acid therethrough to dissolve the inorganic compounds. The thus purified polyethylene can be separated from the crude reaction mass by filtration.

The transition metal compound may have the formula $$Me(X)_n(RCOO)_{v-n}$$

where Me represents the transition metal, X is halogen, R is an alkyl or aryl radical which may be halogen-substituted, $v$ is the maximum valency of the metal and $n$ is an integer varying in value between 1 and $(v-1)$. In the case of titanium, for example, the crystalline, insoluble compound may have the formula $$Ti(Cl)_n(RCOO)_{4-n}$$

where R is an alkyl radical containing from 1 to 8 carbon atoms, or phenyl.

The polyethylenes produced in accordance with this invention, using the new catalysts comprising microcrystalline solid portions and containing transition metals and organometallic bonds, have a molecular weight of at least 50,000 and may have molecular weights in the millions.

Since some changes and variations may be made in carrying out this invention without departing from the spirit thereof, we intend to include within the scope of the appended claims all such changes and modifications as may be apparent to those skilled in the art.

What is claimed is:
1. A process for producing linear, highly crystalline polyethylene having a molecular weight above 50,000, being practically free of branchings, and having a melting range between 135° C. and 145° C. which process comprises polymerizing ethylene in an inert hydrocarbon solvent and in contact with a catalyst which is at most only partially soluble in the inert hydrocarbon solvent, said catalyst consisting essentially of micro-crystalline portions, containing direct metal-to-carbon bonds and being prepared by mixing (a) an organometallic compound having a formula selected from the group consisting of MeR₂ and MeR₃, in which Me is a metal selected from the group consisting of Al, Mg, Be and Zn, at least all but one of the R's being alkyl radicals containing from 2 to 16 carbon atoms and the remaining R, if any, being a member selected from the group consisting of said alkyl radicals, alkoxy radicals containing 2 to 4 carbon atoms, and halogen; with (b) a solid, crystalline compound having the formula $Ti(X)_r(RCOO)_{4-n}$, in which X is halogen, R is selected from the group consisting of alkyl and aryl radicals and halogenated alkyl and aryl radicals and n is an integer varying between one and (4—1), said catalyst being at most only partially soluble in hydrocarbon solvents.

2. The process according to claim 1, characterized in that the catalyst is prepared by mixing (a) an alkyl aluminum compound with (b) a crystalline, insoluble compound of titanium.

3. The process according to claim 1, characterized in that the catalyst is prepared by mixing (a) an alkyl aluminum compound with (b) a crystalline titanium compound of the formula $$Ti(Cl)_n(RCOO)_{4-n}$$

in which R is an alkyl radical containing from 1 to 8 carbon atoms.

4. The process according to claim 1, characterized in that the catalyst is prepared by mixing (a) an alkyl aluminum compound with (b) a crystalline titanium compound of the formula $$Ti(Cl)_n(RCOO)_{4-n}$$

in which R is a phenyl radical.

5. The process according to claim 1, characterized in that the catalyst is prepared by mixing (a) an alkyl aluminum compound with (b) the crystalline titanium compound, $TiCl_2(CH_3COO)_2$.

6. The process according to claim 1, characterized in that the catalyst is prepared by mixing (a) an alkyl aluminum compound with (b) the crystalline titanium compound, $TiCl_3(C_6H_5COO)$.

7. The process according to claim 1, characterized in that the catalyst is prepared by mixing (a) an alkyl aluminum compound with (b) the crystalline titanium compound, $TiCl_2(CH_3CH_2COO)_2$.

8. A new polymerization catalyst consisting essentially of micro-crystalline portions, containing direct metal-to-carbon bonds, and prepared by mixing (a) an organometallic compound having a formula selected from the group consisting of MeR₂ and MeR₃ wherein Me is a metal selected from the group consisting of Al, Mg, Be and Zn, at least all but one of the R's being alkyl radicals containing 2 to 16 carbon atoms and the remaining R, if any, being a member selected from the group consisting of said alkyl radicals, alkoxy radicals containing 2 to 4 carbon atoms, and halogen; with (b) a solid, crystalline compound having the formula $$Ti(X)_n(RCOO)_{4-n}$$

wherein X is halogen, R is selected from the group consisting of alkyl and aryl radicals and halogenated alkyl and aryl radicals and n is an integer varying between one and (4—1), said catalyst being at most only partially soluble in hydrocarbon solvents.

9. A new polymerization catalyst according to claim 8 and prepared by mixing (a) an alkyl aluminum compound with (b) a crystalline titanium chloride-acetate in which the titanium has the maximum valency corresponding to its position in the Periodic Table.

10. A new polymerization catalyst according to claim 8 and prepared by mixing (a) an alkyl aluminum compound with (b) a crystalline titanium chloride-propionate in which the titanium has the maximum valency corresponding to its position in the Periodic Table.

11. A new polymerization catalyst according to claim 8 and prepared by mixing (a) an alkyl aluminum compound with (b) a crystalline titanium chloride-benzoate in which the titanium has the maximum valency corresponding to its position in the Periodic Table.

12. A new polymerization catalyst according to claim 8 and prepared by mixing (a) an alkyl zinc compound with (b) a crystalline titanium chloride-acetate in which the titanium has the maximum valency corresponding to its position in the Periodic Table.

13. A new polymerization catalyst according to claim 8 and prepared by mixing (a) an alkyl zinc compound with (b) a crystalline titanium chloride-propionate in which the titanium has the maximum valency corresponding to its position in the Periodic Table.

14. A new polymerization catalyst according to claim 8 and prepared by mixing (a) an alkyl zinc compound with (b) a crystalline titanium chloride-benzoate in which the titanium has the maximum valency corresponding to its position in the Periodic Table.

15. A new polymerization catalyst according to claim 8 and prepared by mixing (a) diethyl aluminum monochloride with (b) a crystalline titanium chloride-acetate in which the titanium has the maximum valency corresponding to its position in the Periodic Table.

16. A new polymerization catalyst according to claim 8 and prepared by mixing (a) diethyl aluminum monochloride with (b) a crystalline titanium chloride-propionate in which the titanium has the maximum valency corresponding to its position in the Periodic Table.

17. A new polymerization catalyst according to claim 8 and prepared by mixing (a) diethyl aluminum monochloride with (b) a crystalline titanium chloride-benzoate in which the titanium has the maximum valency corresponding to its position in the Periodic Table.

18. A new polymerization catalyst according to claim 8 and prepared by mixing (a) triethyl aluminum with (b) the crystalline titanium compound, $TiCl_2(CH_3COO)_2$.

19. A new polymerization catalyst according to claim 8 and prepared by mixing (a) diethyl aluminum monochloride with (b) the crystalline titanium compound, $TiCl_2(CH_3COO)_2$.

20. A new polymerization catalyst according to claim 8 and prepared by mixing (a) diethyl aluminum monochloride with (b) the crystalline titanium compound, $TiCl_3(C_6H_5COO)$.

21. A new polymerization catalyst according to claim 8 and prepared by mixing (a) diethyl aluminum monochloride with (b) the crystalline titanium compound, $TiCl_2(CH_3CH_2COO)_2$.

22. A now polymerization catalyst according to claim 8 and prepared by mixing (a) diethyl aluminum monochloride with (b) crystalline titanium chloride-trichloroacetate, in which the titanium has the maximum valency corresponding to its position in the Periodic Table.

References Cited in the file of this patent
UNITED STATES PATENTS 2,824,089    Peters et al. _____ Feb. 18, 1958
2,827,446    Breslow _____ Mar. 18, 1958

FOREIGN PATENTS 534,792    Belgium _____ Jan. 31, 1955

UNITED STATES PATENT OFFICE

CERTIFICATION OF CORRECTION

Patent No. 2,940,964

June 14, 1960

Rino Mostardini et al.

It is hereby certified that error appears in the above numbered patent requiring correction and that the said Letters Patent should read as corrected below.

In the grant, lines 1, 2 and 3, for "Rino Mostardini and Alberto Alberti, of Milan, Italy," read -- Rino Mostardini and Alberto Alberti, of Milan, Italy, assignors to Montecatini Societa Generale per l'Industria Mineraria e Chimica, of Milan, Italy, --; line 12, for "Rino Mostardini and Alberto Alberti, their heirs" read -- Montecatini Societa Generale per l'Industria Mineraria e Chimica, its successors --; in the heading to the printed specification, lines 4 and 5, for "Rino Mostardini and Alberto Alberti, 18 Via F. Turati, Milan, Italy" read -- Rino Mostardini and Alberto Alberti, Milan, Italy, assignors to Montecatini Societa Generale per l'Industria Mineraria e Chimica, Milan, Italy --.

Signed and sealed this 18th day of April 1961.

(SEAL)
Attest:

ERNEST W. SWIDER
Attesting Officer

DAVID L. LADD
Commissioner of Patents

UNITED STATES PATENT OFFICE

CERTIFICATE OF CORRECTION

Patent No. 2,940,964                                                June 14, 1960

Rino Mostardini et al.

It is hereby certified that error appears in the above numbered patent requiring correction and that the said Letters Patent should read as corrected below.

Column 4, line 18, for "tetanium" read -- titanium --; line 34, for "halnium" read -- hafnium --; column 5, line 20, for the formula "$Ti(X)_r(RCOO)_{4-n}$" read -- $Ti(X)_n(RCOO)_{4-n}$ --.

Signed and sealed this 7th day of November 1961.

(SEAL)
Attest:

ERNEST W. SWIDER
Attesting Officer

DAVID L. LADD
Commissioner of Patents

USCOMM-DC